United States Patent [19]
Durm et al.

[11] Patent Number: 4,997,117
[45] Date of Patent: Mar. 5, 1991

[54] FASTENING ARRANGEMENT OF A ROOF LUGGAGE CARRIER AT A MOTOR VEHICLE

[75] Inventors: Juergen Durm, Ditzingen; Ulrich Hempel, Renningen, both of Fed. Rep. of Germany

[73] Assignee: Dr. Ing. h.c.F. Porsche AG, Fed. Rep. of Germany

[21] Appl. No.: 295,358

[22] Filed: Jan. 10, 1989

[30] Foreign Application Priority Data

Jan. 26, 1988 [DE] Fed. Rep. of Germany ....... 3802160

[51] Int. Cl.$^5$ ............................................... B60R 9/04
[52] U.S. Cl. .................................... 224/315; 224/322; 224/329
[58] Field of Search ............... 224/309, 314, 317, 315, 224/319, 322–326, 329, 331, 42, 45 R; 296/37.7, 37.8; 248/219.4, 220.2, 222.4

[56] References Cited

U.S. PATENT DOCUMENTS

| 3,253,755 | 5/1966 | Bott | 224/326 |
| 3,519,180 | 7/1970 | Bott | 224/321 |
| 3,840,250 | 10/1974 | Bott | 224/326 |
| 4,281,783 | 8/1981 | Ingram | 224/325 |
| 4,364,498 | 12/1982 | Kuus et al. | 224/314 |
| 4,538,752 | 9/1985 | Welter | 224/309 |

FOREIGN PATENT DOCUMENTS

| 3032099 | 8/1980 | Fed. Rep. of Germany | 224/329 |
| 2939671 | 4/1981 | Fed. Rep. of Germany | 224/309 |
| 3306360 | 9/1984 | Fed. Rep. of Germany | 224/309 |
| 3642864 | 12/1986 | Fed. Rep. of Germany | 224/309 |
| 3626926 | 2/1988 | Fed. Rep. of Germany | 224/315 |
| 2233477 | 1/1975 | France . | |
| 2147680 | 5/1985 | United Kingdom | 224/309 |

Primary Examiner—Henry J. Recla
Assistant Examiner—Casey Jacyna
Attorney, Agent, or Firm—Evenson, Wands, Edwards, Lenahan & McKeown

[57] ABSTRACT

In a roof luggage carrier fastening arrangement on a motor vehicle, a support leg of the roof luggage carrier is extended section-wise to the outside of the body and is retained in position by means of a fastening element, whereby the fastening element is screwed into an internal thread fixed on the body side. In order that the roof luggage carrier, with a simple construction, can be installed on the vehicle rapidly and safe against theft, the fastening element is formed by a threaded pin adjustable from a passenger space, which includes an end-retaining section on the side facing the support leg, over which the support leg is adapted to be slipped by means of a longitudinal slot open in the insert direction. By tightening the threaded pin in the direction of the passenger space, the support leg can be clamped against the body.

18 Claims, 3 Drawing Sheets

FASTENING ARRANGEMENT OF A ROOF LUGGAGE CARRIER AT A MOTOR VEHICLE

BACKGROUND AND SUMMARY OF THE INVENTION

The present invention relates to a fastening arrangement for a roof luggage carrier or roof rack at a motor vehicle whereby a support leg of the roof luggage carrier is extended section-wise to the outside of the body and is retained in position by means of a fastening element that is screwed into an internal thread fixed on the body side.

In a known roof luggage carrier fastening arrangement of the aforementioned type (DE-OS 33 06 360) a threaded sleeve is arranged inside of the roof girder, into which a bolt is screwed in from the vehicle outside. The screw is extended through an opening of the support leg after the emplacement of the support leg (adapter) on the body.

This prior art arrangement entails the disadvantage that the installation of the roof luggage carrier is time consuming because prior to the emplacement of the support leg, the bolts have to be screwed out of the threaded sleeves and subsequently have to be completely screwed in again. An arrangement of the bolts safe against theft is achieved with this construction in that an upper frame part of the door is extended up so far that it covers the bolts when the door is closed. The assembly of the roof luggage carrier is therefore possible only with an opened door.

It is the object of the present invention to provide a roof luggage carrier fastening arrangement at a motor vehicle which combined with good functioning has a simple construction and can be installed rapidly at the vehicle. Additionally, the fastening elements are to be arranged also safe against theft with an open door.

The underlying problems are solved according to the present invention in that the fastening element is formed by a threaded pin adapted to be adjusted from a passenger space of the motor vehicle, which on the side facing the support leg has an end retaining section, over which the support leg is adapted to be slipped by means of a longitudinal slot open in the insert direction and in that by tightening the threaded pin in the direction of the passenger space the support leg is adapted to be clamped against the body.

The advantages principally achieved with the present invention reside in that owing to the construction of the support leg and of the fastening element, a roof luggage carrier fastening arrangement is created which, combined with good functioning, is simple in construction and can be rapidly assembled at the body and disassembled therefrom. Additionally, the fastening element is arranged secure against theft independently of the position of the door. A simple sliding of the support legs over the retaining sections of the threaded pin is achieved by the longitudinal slots opened in the insert direction without having to disassemble the threaded pins prior thereto. The assembly position of the threaded pin for the emplacement of the support legs is defined by the extension provided at the threaded pin when the latter abuts at the end face of the internal thread. The hexagonal recess arranged on the threaded pin brings about that the latter can be actuated, respectively, adjusted in a simple manner from the passenger space. A good protection against theft for the roof luggage carrier is achieved thereby.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
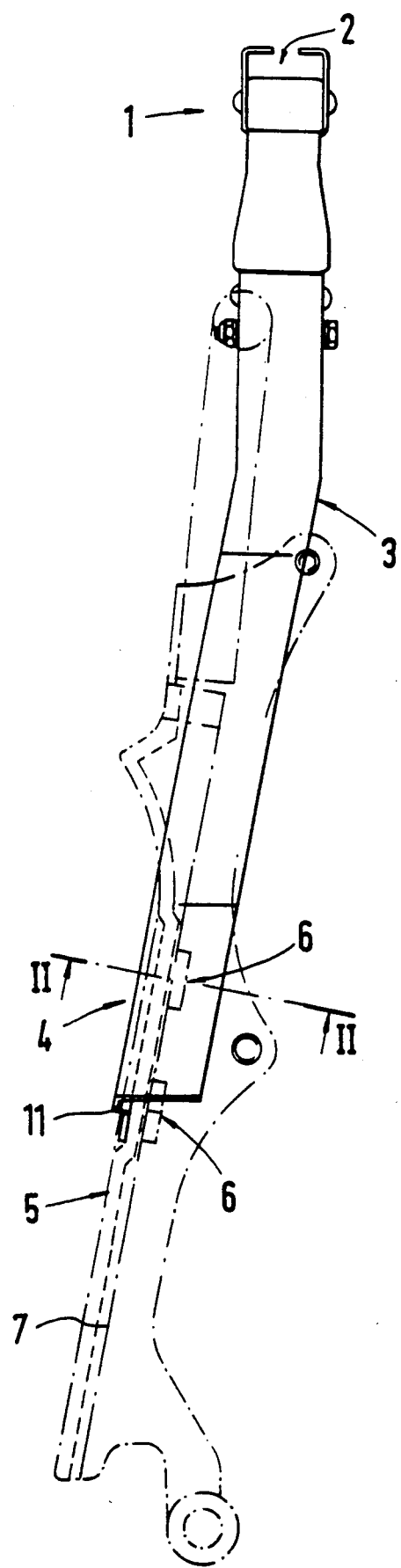
FIG. 1 is a side elevational view of a roof luggage carrier fastening arrangement in accordance with the present invention.

Referring now to the drawing wherein like reference numerals are used throughout the various views to designate like parts, a rear roof luggage carrier or rack 1 of a roof transport system is illustrated in FIG. 1 which is composed of a transversely extending carrier part 2 and of lateral outwardly disposed support legs 3. The support legs 3 abut with their lower end areas 4 section-wise at the outside of the body 5 of a motor vehicle and are retained in position by means of fastening elements 6.

Figure 2:
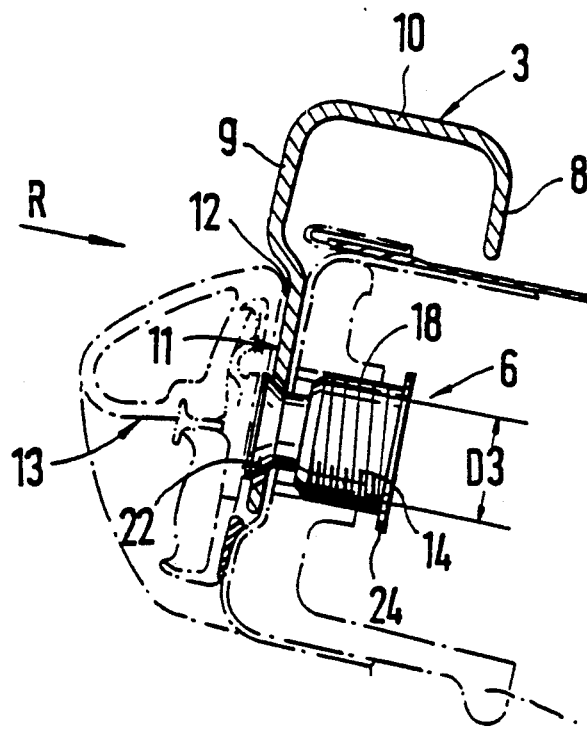
FIG. 2 is a cross-sectional view taken along line II—II of FIG. 1 on an enlarged scale, with a tightened roof luggage carrier.

According to FIG. 2, the support legs 3 are secured at a pivotal main support 7 of a convertible top not illustrated in detail.

The support legs 3 are profiled approximately U-shaped as viewed in cross section whereby the two legs 8 and 9 extend in the vehicle transverse direction whereas the connecting web 10 is aligned approximately parallel to a vehicle longitudinal direction. The leg 9 includes within the fastening area of the support leg 3 a plate-shaped shoulder part 11 offset which extends in continuation of the leg 9 and is arranged offset with respect thereto. During the installation of the roof luggage carrier 1, the plate-shaped shoulder part 11 is introduced into a gap opening 12 between the main support 7 and a sealing bar 13 attached at the main support and is mounted over the fastening elements 6 arranged one above the other. The gap opening 12 extends in the vehicle transverse direction and is constructed open toward the outside.

Figure 4:
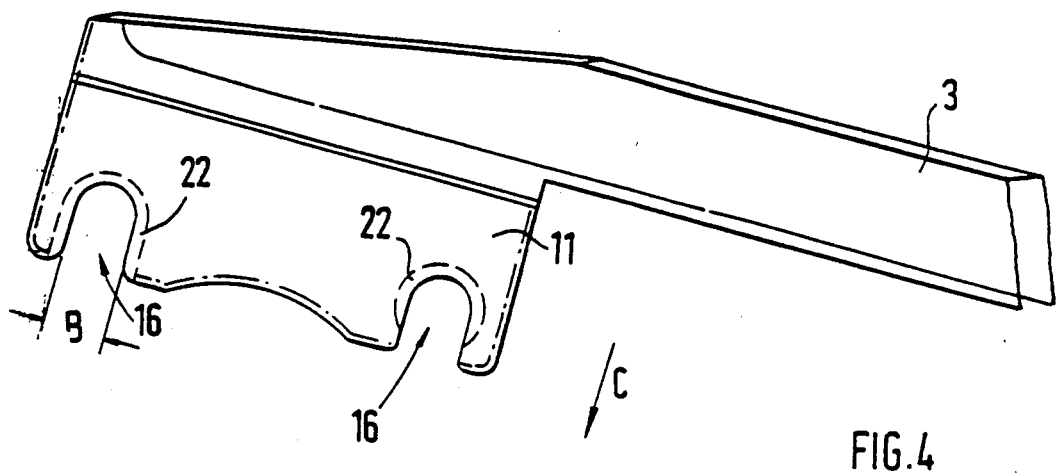
FIG. 4 is an elevational view taken in the direction of arrow R of FIG. 2.

Each fastening element 6 is formed by a threaded pin 14 adjustable from a passenger space 17, which includes on the side facing the support leg 3 an end retaining section 15 (FIG. 5) over which the support leg 3 is adapted to be slipped by means of a longitudinal slot 16 (FIG. 4) open in the insertion direction. A clamping of the support leg 3 against the body 5 is achieved in that the threaded pin 14 inserted into an internal thread 18 of the main support 7 is rotated in the direction toward the passenger space 17.

The retaining section 15 is composed of a cylindrical area 19 (FIG. 5) adjoining the threaded pin 14 and of an end clamping collar 20. The cylindrical area 19 has a diameter D1 which is somewhat smaller than the width B of the longitudinal slot 16. By contrast, the largest diameter D2 in connection with the end clamping collar 20 is larger than the width B (FIG. 4) of the longitudinal slot 16 but smaller than the root diameter D3 of the internal thread 18. Owing to this construction, the retaining section 15 can be extended from the passenger space 17 through the internal thread 18.

Figure 5:
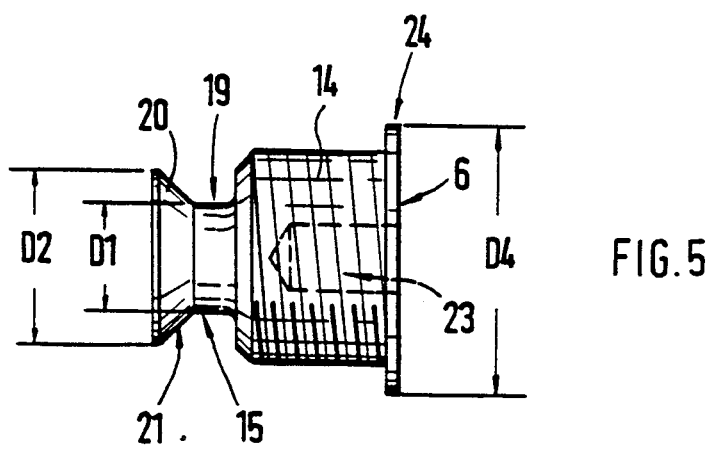
FIG. 5 is a cross-sectional view of the threaded pin according to FIG. 2, on an enlarged scale.

According to FIG. 5, the clamping collar 20 includes on the side facing the cylindrical area 19 a chamfer or bevelling 21 of truncated conical shape which cooperates with a corresponding chamfer or bevelling 22 of a longitudinal slot 16. The emplacement of the support leg 3 over the retaining section 15 of the threaded pin 14 and the subsequent tightening of the threaded pin 14 is facilitated by the bevelling 21 and the bevelling 22. However, the possibility also exists that the clamping collar 20 be also cylindrically construction and that no bevelling 22 be provided at the longitudinal slot 16.

Figure 3:
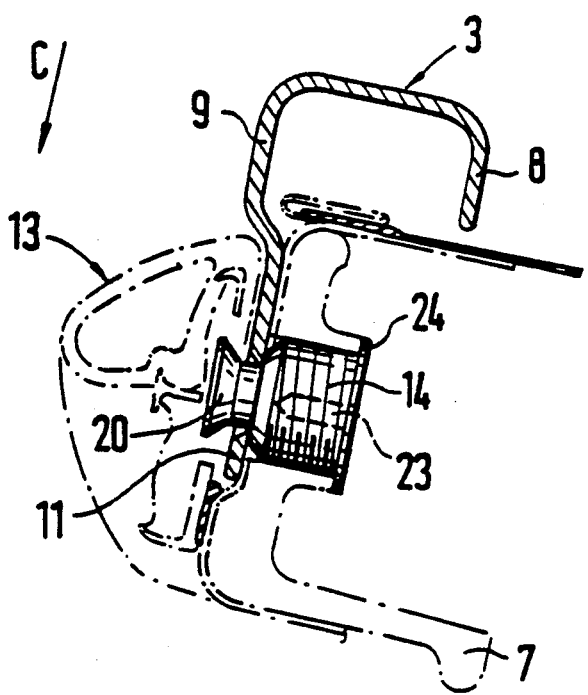
FIG. 3 is a cross-sectional view corresponding to FIG. 2, however, with an emplaced but non-fastened roof luggage carrier.

A hexagonal internal recess 23 is formed in the end face of the threaded pin 14 facing the passenger space 17 for the simple adjusting movement of the threaded pin 14, into which a corresponding auxiliary tool is adapted to be inserted. Additionally, a cylindrical extension 24 (FIG. 2) is arranged on the threaded pin 14 at the end facing the passenger space 17, which has a larger diameter D4 than the diameter D3 of the internal thread 18. The extension 24, with a fully screwed-in threaded pin 14 is supported at the inside of the main support 7, respectively, at the inwardly disposed end of the internal thread 18, whereby in this position of the threaded pin 14, the emplacement of the support leg 3 over the retaining section takes place (FIG. 3). The end clamping collar 20 thereby extends with a spacing relative to the plate-shaped shoulder 11 of the support leg 3 so that the support legs 3 can be mounted over the cylindrical area 19 of the threaded pin 14.

The two longitudinal slots 16 extend——as viewed in height direction——with a distance to one another and are open in the insertion direction C so that during the emplacement of the support leg 3 the threaded pins 14 can remain in their screwed-in position.

According to FIGS. 2 and 3, the internal thread 18 is arranged directly at the outwardly disposed body 5 which is formed within this area by the main support 7. However, the possibility also exists in accordance with the present invention that the internal thread 18 is arranged on a threaded sleeve (not shown) which is securely connected subsequently with the body 5. Additionally, such a roof luggage carrier fastening arrangement may take place in all areas of the body, i.e., not exclusively at a main support 7.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A combined vehicle roof luggage carrier fastening arrangement and motor vehicle, comprising: a roof luggage carrier member having support leg means which are extended section-wise to an outside of a motor vehicle body and which are retained in position on the vehicle body by fastening means screwed into internal thread means fixed on an inside of the vehicle body and open to a passenger space in the vehicle, the fastening means being formed by a threaded pin means rotatably adjustable from a passenger space of the motor vehicle to be withdrawn towards the passenger space upon rotation, said threaded pin means having an end clamping portion and a cylindrical retaining section on a side of the vehicle body facing the support leg means, the support leg means having at least one open slot facing the fastening means and operable to be slidingly mounted over the cylindrical retaining section by sliding insertion of the slot of the support leg around the cylindrical retaining section, and the support leg means being operable to be clamped against the body by tightening of the threaded pin means in the direction of the passenger space to cause the clamping portion to engage an outer edge of the support means adjacent the slot after it has been inserted to slidingly surround the cylindrical retaining section and to force an inner edge of the support means against the vehicle body as the threaded pin means is withdrawn towards the passenger space.

2. A fastening arrangement according to claim 1, wherein the cylindrical area has a smaller diameter than the width of the longitudinal slot.

3. A fastening arrangement according to claim 2, wherein the end clamping portion has a diameter which is larger than a width of the slot and smaller than a root diameter of the fixed internal thread means on the vehicle body which threadingly engages the threaded pin means.

4. A fastening arrangement according to claim 3, wherein the end clamping portion has a bevelling of conically truncated shape on a side facing the cylindrical area and wherein the truncated shape cooperates with a corresponding bevelling of the longitudinal slot that faces the truncated shape.

5. A fastening arrangement according to claim 4, wherein the threaded pin means has a hexagonal recess in a end face fecing the passenger space.

6. A fastening arrangement according to claim 5, wherein the threaded pin means is provided with an extension means on a side that faces the passenger space and wherein the extension means has a diameter layer than the root diameter of the fixed internal thread means.

7. A fastening arrangement according to claim 6, wherein the fixed internal thread means is formed directly in the vehicle body.

8. A fastening arrangement according to claim 7, wherein the extension means is supported at an end face of the internal thread means and wherein the extension means limits movement of the threaded pin means away from the passenger space to define an assembly position of the threaded pin means for the insertion of the slot of the support leg means around the round retaining section.

9. A fastening arrangement according to claim 8, wherein the vehicle body is a main support of a vehicle convertible top, and wherein the threaded pin means is screwed into a threaded bore provided in the main support.

10. A fastening arrangement according to claim 9, wherein the support leg means is inserted into a gap opening between the main support and a seal secured thereon.

11. A fastening arrangement according to claim 1, wherein the end clamping portion has a diameter which is larger than a width of the slot and smaller than a root diameter of the fixed internal thread means on the vehicle body which threadingly engages the threaded pin means.

12. A fastening arrangement according to claim 1, wherein the end clamping portion has a bevelling of conically truncated shape on a side facing the cylindrical area and wherein the truncated shape cooperates with a corresponding bevelling of the longitudinal slot that faces the truncated shape.

13. A fastening arrangement according to claim 1, wherein the threaded pin means has a hexagonal recess in a end face facing the passenger space.

14. A fastening arrangement according to claim 1, wherein the threaded pin means is provided with an extension means on a side that faces the passenger space and wherein the extension means has a diameter larger than the root diameter of the fixed internal thread means.

15. A fastening arrangement according to claim 14, wherein the extension means is supported at an end face of the internal thread means and wherein the extension means limits movement of the threaded pin means away from the passenger space to define an assembly position of the threaded pin means for the insertion of the slot of the support leg means around the round retaining section.

16. A fastening arrangement according to claim 1, wherein the fixed internal thread means is formed directly in the vehicle body.

17. A fastening arrangement according to claim 1, wherein the vehicle body is a main support of a vehicle convertible top, and wherein the threaded pin means is screwed into a threaded bore provided in the main support.

18. A fastening arrangement according to claim 17, wherein the support leg means is inserted into a gap opening between the main support and a seal secured thereon.

* * * * *